United States Patent [19]

Teuling

[11] Patent Number: 4,871,951
[45] Date of Patent: Oct. 3, 1989

[54] PICTURE DISPLAY DEVICE INCLUDING A LINE SYNCHRONIZING CIRCUIT AND A LINE DEFLECTION CIRCUIT

[75] Inventor: Dirk J. A. Teuling, Eindhoven, Netherlands

[73] Assignee: U.S. Philips Corporation, New York, N.Y.

[21] Appl. No.: 253,795

[22] Filed: Oct. 5, 1988

Related U.S. Application Data

[63] Continuation of Ser. No. 113,432, Oct. 23, 1987, abandoned.

[51] Int. Cl.$^4$ .................. H01J 29/70; H01J 29/76
[52] U.S. Cl. ............................. 315/408; 315/371; 358/158
[58] Field of Search .................. 315/371, 400, 408; 358/158

[56] References Cited

U.S. PATENT DOCUMENTS

| | | | |
|---|---|---|---|
| 4,187,451 | 2/1980 | Boekhorst | 315/381 |
| 4,510,527 | 4/1985 | den Hollander | 358/158 |
| 4,533,855 | 8/1985 | Willis et al. | 315/370 |
| 4,565,949 | 1/1986 | Haferl | 315/371 |

Primary Examiner—Theodore M. Blum
Attorney, Agent, or Firm—Edward W. Goodman

[57] ABSTRACT

A picture display device, having a line synchronizing circuit and a line deflection circuit, suitable for several line frequencies. Use is made of a modulator for modulating the line deflection current, a control stage being coupled to this modulator for applying a correction signal for correcting, in dependence on the frequency of a line oscillator in the line synchronizing circuit, the S-distortion or the linearity error, respectively, or to keep the amplitude of the line deflection current constant upon a change in the line frequency.

13 Claims, 3 Drawing Sheets

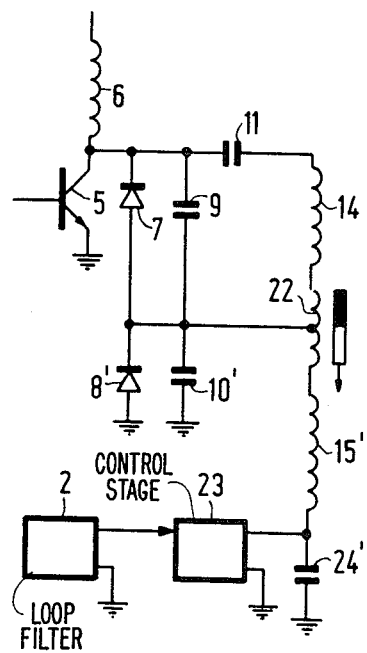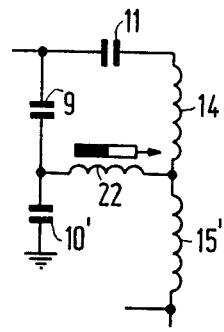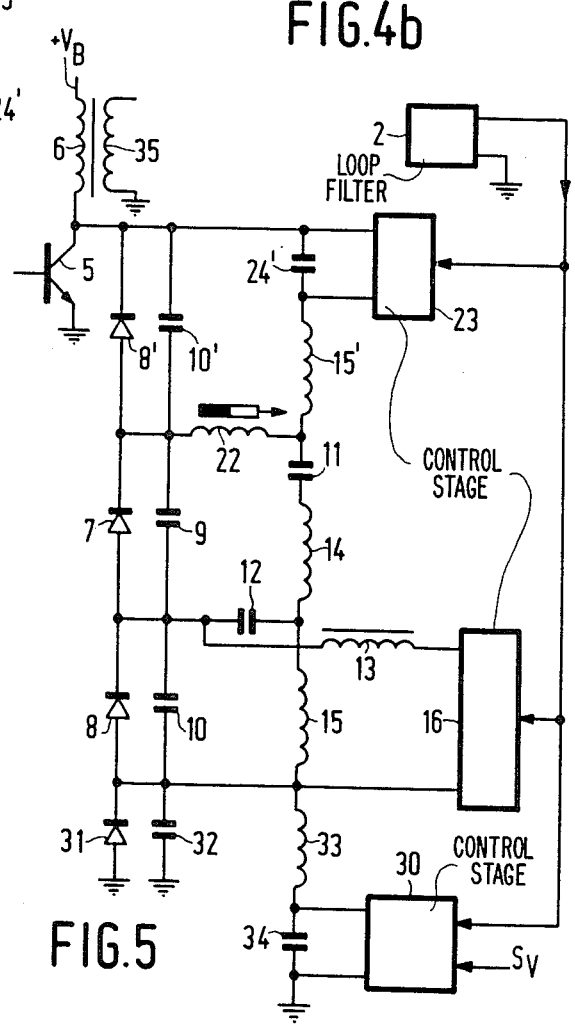
FIG.4a
FIG.4b
FIG.5

PICTURE DISPLAY DEVICE INCLUDING A LINE SYNCHRONIZING CIRCUIT AND A LINE DEFLECTION CIRCUIT

This a continuation division of application Ser. No. 113,432, filed Oct. 23, 1987.

BACKGROUND OF THE INVENTION

1. Field of the Invention

The invention relates to a picture display device, including a line synchronizing circuit implemented as a phase control loop for synchronizing a line oscillator with an incoming line synchronizing signal, and a line deflection circuit coupled to the oscillator for generating a line deflection current having a trace and a retrace through a line deflection coil, the coil being coupled to a correction device comprising modulation means for modulating the line deflection current.

2. Description of Related Art

Such a line deflection circuit is disclosed in European Patent Specification 13,598. This prior art circuit includes a modulator for field-frequency modulating the amplitude of the line deflection current for correcting the east-west distortion. A capacitor for the S-correction is arranged in series with the line deflection coil and the circuit is of such a construction that also the S-correction is subjected to a modulation at the field frequency. Also a linearity correction coil with a saturable core, which is included in the arrangement in such a manner, that also the magnitude of the linearity correction varies with field frequency, is arranged in series with the coil. The prior art circuit forms part of a color television receiver and the control signal thereof, coming from a line oscillator, has consequently the line frequency prescribed by a television standard.

The prior art circuit is, however, not suitable for use in a picture display device, for example a monitor in which the line frequency may have different values. Since the line oscillator is controlled, it is always capable of assuming the appropriate frequency, provided it is designed properly but it will be obvious that the line deflection current generated and corrected by means of a circuit comprising frequency-dependent elements cannot vary appropriately as a function of time for all the line frequencies applied.

SUMMARY OF THE INVENTION

The invention has for its object to provide a means to render the prior art circuit suitable for use in a wide line frequency range. To that end, a picture display device of the above-defined type, is characterized in that an input of a control stage is coupled to the line synchronizing circuit and an output is coupled to the modulation means for correcting, in dependence on the frequency of the line oscillator, a deflection error upon a change of the line frequency.

Because of the measure according to the invention, the modulator is controlled by the control stage so that the line deflection current always has the desired variation when the line frequency changes. For this an appropriate transfer of the control stage can be found. As a function of the frequency, the deflection correction varies such that the deflection error to be corrected is kept small in a wide line frequency range. It should be noted that the correction control obtained is a foward control. Small residual errors can be corrected by means of a backward control.

A picture display device for which the modulation means are suitable for modulating the magnitude of the S-correction, may be characterized in that the control stage is coupled to the modulation means for generating, during the trace period, a correction signal for correcting the S'distortion upon a change in the line frequency.

A picture display device in which the modulation means are suitable for modulating the magnitude of the linearity correction, may be characterized in that the control stage is coupled to the modulation means for generating, during the trace period, a correction for correcting the linearity error upon a change in the line frequency.

A picture display device in which the modulation means are suitable for modulating the amplitude of the line deflection current, may be characterized in that the control stage is coupled to the modulation means for generating a correction signal for influencing the value of the trace voltage present across the line deflection coil during the trace period for maintaining the amplitude of the line deflection current substantially constant upon a change in the line frequency.

In doing so, the deflection errors to be corrected can be corrected individually. These errors may alternatively be corrected all together, more specifically with the aid of three separate control stages.

For the S-correction, a picture display device, may be characterized in that the control stage is connected to an S-capacitor for producing during the trace period a correction current which flows through said capacitor in a direction opposite to the direction of the line deflection current through this capacitor and decreases versus an increasing line frequency.

For the linearity correction, a picture display device for which the correction arrangement comprises a linearity correction arrangement in the form of a saturated inductor arranged in series with the line deflection coil, may be characterized in that the control stage is coupled to the linearity correction, arrangement for producing during the trace period, a correction current flowing through said arrangement in a direction opposite to the direction of the line deflection current through this arrangement and increases versus an increasing line frequency, or flows through said arrangement in the same direction as the line deflection current and decreases versus an increasing line frequency.

By a suitable design, the picture display device may be characterized by one single control stage for producing both the correction current for correcting the S-distortion and the correction current for correcting the linearity error.

BRIEF DESCRIPTION OF THE DRAWINGS

The invention will now be described in greater detail by way of example with reference to the accompanying Figures. Herein:

FIGS. 3, 4, 5, 6 and 7 show variants of the picture display device shown in FIG. 1.

DESCRIPTION OF THE PREFERRED EMBODIMENT

In a picture display device, the current flowing through the coil for the horizontal deflection, the line deflection current, has a sawtooth variation as a function of time. If first this variation is assumed to be linear during the trace period, then the voltage across the coil, the trace voltage, is constant. When the line frequency is changed, the width of the displayed picture should preferably not change, so the amplitude of the current remains constant, which means that the trace voltage is inversely proportional to the duration of the trace period and consequently is approximately proportional to the frequency. In a rough approximation, the retrace period is so short as to be disregarded. What is commonly referred to as the S-capacitor is usually arranged in series with the line deflection coil. Since the capacitance of this capacitor is not infinitely large, the voltage across it is parabolic and of the line frequency. For a specific picture display tube, the ratio between the trace voltage and the amplitude of the parabolic voltage must be constant. This implies that also the amplitude must be proportional to the frequency. As the amplitude of the parabolic voltage produced by the line deflection current across the capacitor decreases versus an increasing frequency, it will be obvious that a correction circuit is required for obtaining the desired dependence on frequency. In this situation, because of the simplifications provided, this dependence is not exactly a proportionality.

Figure 1:
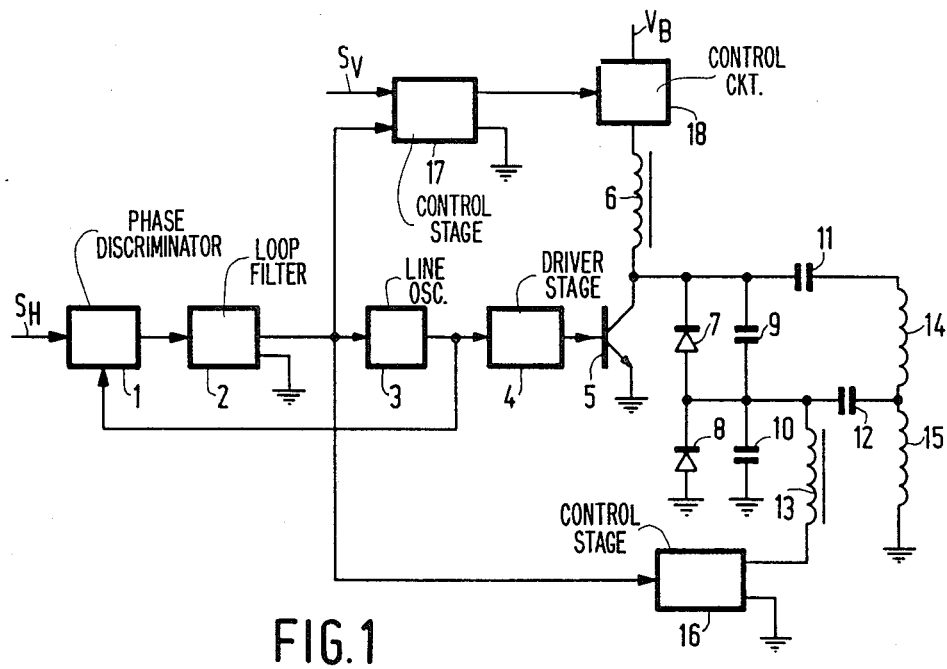
FIG. 1 shows the relevant portion of a picture display device according to the invention.

FIG. 1 illustrates such a correction circuit. In this Figure, reference numeral 1 denotes a phase discriminator to which an incoming line synchronizing signal $S_H$ and a signal generated by a line oscillator 3 is applied. A retrace pulse derived from the signal of oscillator 3 may alternatively be used as a locally generated signal. The output voltage of discriminator 1, which depends on the phase difference between the two signals applied, is smoothed by means of a loop filter 2. The smoothed voltage obtained is the control voltage used to control oscillator 3 for obtaining the same frequency and substantially the same phase as the incoming line synchronizing signal. In this situation, the picture display device, of which the present circuit forms part and of which only those portions which are relevant to the invention are shown, is suitable for more than one line frequency. The device is, for example, a monitor which can be connected to different signal sources having different line frequencies. Such signal sources are, for example, video sources for producing signals in accordance with television standards, home computers, teletext circuits with accelerated read-out, etc. It is a prequisite that oscillator 3 is capable of being synchronized with all the incoming line frequencies.

A driver stage 4 amplifies the signal of line oscillator 3 and the amplified signal is applied to the base of a switching transistor 5 of the npn-type. The emitter of this transistor 5 is connected to ground, while the collector is connected to a supply inductance 6, to the cathode of a first parallel diode 7, to a first retrace capacitor 9 and to a first trace or S-capacitor 11. The anode of diode 7 is connected to the cathode of a second parallel diode 8, to the other terminal of capacitor 9, to a second retrace capacitor 10, to a second trace or S-capacitor 12 and to an inductance 13. A line deflection coil 14 is connected between the other terminal of capacitor 11 and the other terminal of capacitor 12, and a compensation coil 15 is connected to the junction of capacitor 12 and coil 14. The anode of diode 8 and the other terminal of capacitor 10, and also the other terminal of coil 15, are connected to ground. In a manner still further to be described, the other terminal of inductance 6 is coupled to the positive terminal of the supply voltage source $V_B$ of the circuit, the negative terminal being connected to ground, while the other terminal of inductance 13 is connected to a first control stage 16 still further to be described.

Everything written in the foregoing is known. Components 1, 2 and 3 form a control loop for generating a line control signal for the horizontal deflection which is synchronized with the incoming line synchronizing signal. Components 4 to 13 form a line deflection circuit which is described in greater detail in United Kingdom Patent Specification 1,459,922 (PHN 6734). This prior art circuit generates a line deflection current having a trace and a retrace and flowing through coil 14, and whose amplitude is subjected, during the trace period, to a variation determined by the above-mentioned first control stage 16. The several components of the deflection circuit satisfy certain tuning conditions defined in the above-mentioned Patent Specification.

According to the invention, the control stage 16 to which the inductance 13 is connected, does not determine the amplitude of the line deflecting current but rather the S-correction variation thereof. For this purpose, first control stage 16 receives, in FIG. 1, the control voltage present at the output of filter 2, for example across a smoothing capacitor. This voltage is a direct indication of the frequency of oscillator 3. The first control stage 16 converts the control voltage into a voltage which is applied to the line deflection circuit via the inductance 13, which operates as an isolation, this applied voltage having a predetermined value as a function of the control voltage at the input of the first control stage 16 and, consequently, as a function of the line frequency. The correction voltage applied to the line deflection circuit produces a correction current which flows through inductance 13 and through the deflection circuit.

In a similar manner, a second control stage 17 receives the control voltage applied to the oscillator 3 for controlling a control circuit 18 arranged between inductance 6 and source $V_B$. Circuit 18 is of a prior art type and may, for example, incorporate a switching transistor whose conduction times are controlled by the output voltage of the second control stage 17. Control circuit 18 generates, at that terminal of inductance 6 not connected to transistor 5, a voltage which operates, less the voltage from the first control stage 16, as a supply voltage for the line deflection circuit, and is determined by the output voltage of the second control stage 17. In this situation, this output voltage has a predetermined value as a function of the oscillator control voltage and consequently of the line frequency. Control stages 16 and 17 each include a d.c. voltage amplifier having the desired dependence between the output and the input voltages, for example with the aid of an appropriate feedback network. The first control stage 16 may incorporate a transistor operating as a controllable load in the manner described in said United Kingdom Patent Specification 1,459,922, or as a controllable switch in the manner described in United Kingdom Patent Specification 1,530,661 (PHB 32536).

Figure 2:
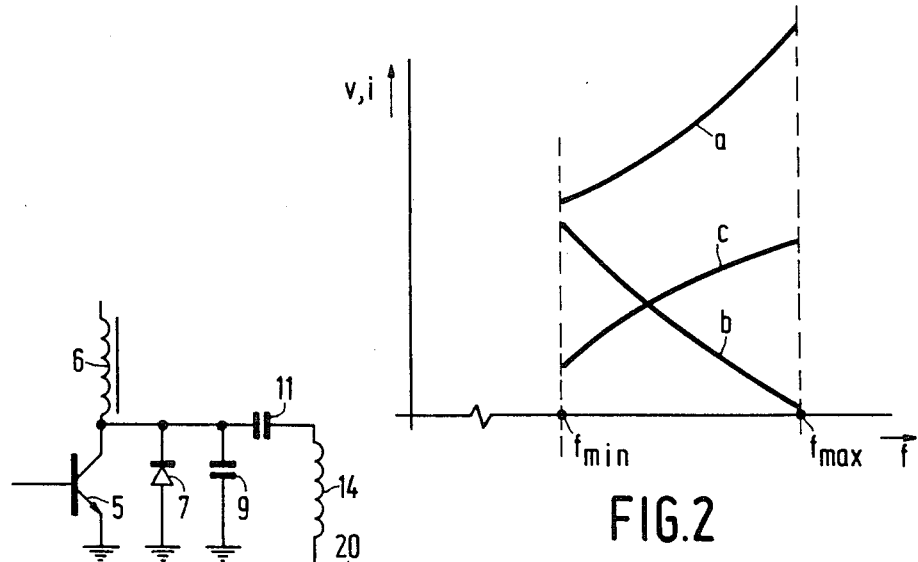
FIG. 2 shows a diagram useful for explaining the invention.

For a given value of the line frequency, the supply voltage of the line deflection circuit has a determined value, which is independent of variations of voltage $V_B$ while, also, the correction current has a determined value. During the trace period the correction current flows through coil 15 and capacitor 12, while the line deflection current flows through capacitors 12 and 11 and through coil 14. Both currents flow through capacitor 12 but in opposite directions. The correction current reduces the parabolic voltage produced by the deflection current across capacitor 12. This reduction increases against an increasing control voltage from the first control stage 16 and results in a decreasing S-correction. The amplitude of the deflection current depends on the value of the trace voltage and, consequently, on the value of the supply voltage. For a different line frequency, the correction current must have such a value that the line deflection current has the required S-shape, while the supply voltage must have such a value that the amplitude of the deflection current is constant. This is to hold for all frequencies to be expected. In FIG. 2 a curve a is plotted as a function of the line frequency f. Curve a represents the variation of the trace voltage required for obtaining a constant amplitude of the line deflection current between the lowest frequency $f_{min}$ and the highest frequency $f_{max}$ for which the picture display device is suitable. The trace voltage is an increasing function of the frequency which somewhat deviates from the proportional function described in the foregoing. Similarly, in FIG. 2 curve b represents the variation of the correction current flowing through capacitor 12 during the trace period under the influence of stage 16. This current is a decreasing function of the frequency for obtaining an increase in the S-correction at higher frequencies.

During the retrace period, both transistor 5 and diodes 7 and 8 are non-conducting. Present on the collector of transistor 5 is a retrace pulse having a large amplitude which, as a function of time, has a cosinusoidal variation with a frequency which is predominantly determined by capacitors 9 and 10 and coils 14 and 15 and, consequently, is constant. Also the retrace period, i.e. the time between the instant at which transistor 5 is cut-off and the instant at which diodes 7 and 8 start conducting again, is constant. As will be apparent from said United Kingdom Patent Specification 1,459,922, this amplitude is constant, that is to say it does not depend on the control voltage produced by the first control stage 16 and also not on the supply voltage. This holds however only for a constant line frequency. Consequently, in the arrangement shown in FIG. 1, inductance 6 cannot be constituted by the primary winding of a transformer having one or a plurality of secondary windings for generating d.c. voltages. The circuit of FIG. 1 is indeed suitable for correcting the east-west distortion. To that end, the second control stage 17 is supplied with a signal $S_V$ of the field frequency, which signal, for example for correcting the pin-cushion distortion, must have the shape of a parabola, which results in the supply voltage and consequently the amplitude of the line deflection current being submitted to a field-frequency variation having the same form.

From the foregoing it will be obvious that the circuit of FIG. 1 is suitable for the S and the east-west corrections and also for stabilizing the line deflection at variations of voltage $V_B$. The circuit is not suitable for correcting the linearity error, as this error is usually corrected by means of a coil with saturated core, which is a component whose impedance is an increasing function of the frequency. At a higher frequency, the ohmic resistance of the line deflection coil has increasingly less influence on the linearity of the deflection current because of the higher impedance of the deflection coil, so that for the impedance of the linearity correction coil, a decreasing function of the frequency is required.

Figure 3:
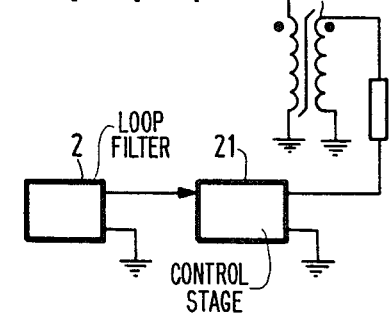

The linearity can indeed be corrected by means of the circuit shown in FIG. 3. This Figure only shows the relevant portion of the circuit, which comprises one parallel diode 7, one retrace capacitor 9 and one trace capacitor 11. The operating winding of a transductor 20, whose control winding is connected to a third control stage 21 via a limiting resistor, is arranged in series with capacitor 11 and the line deflecting coil 14. In a similar manner as with control stages 16 and 17 in FIG. 1, the third control stage 21 converts the control voltage of oscillator 3 into a d.c. voltage, which voltage produces, during the trace period, such a current through the control winding of transductor 20 that the transductor inductance of the operating winding arranged in series with coil 14 has the appropriate value for correcting the linearity of a wide frequency range. For the transfer of of the third control stage 21, such a function can be found that the control current of transductor 20 increases in the correct way versus an increasing frequency, which causes the inductance value of the transductor to decrease in the correct manner. In FIG. 2, curve c shows the variation during the trace period of this control current as a function of the frequency between the frequencies $f_{min}$ and $f_{max}$. It should be noted that curves a, b and c are not plotted in FIG. 2 at the same scale.

FIG. 4a shows the relevant portion of a variant of the circuit of FIG. 1, which is suitable for the linearity correction and does not require a transductor, which is an expensive component. The circuit of FIG. 4a differs from the circuit in FIG. 1 in that a linearity correction coil 22 is included between the line deflection coil 14 and the compensation coil 15' and in that the other end of coil 15' is not connected to ground but to the output of a fourth control stage 23 to whose input the control voltage of oscillator 3 is applied. The first control stage 16 for the S-correction is not connected, so that components 12 and 13 can be omitted. Coil 22 has a saturable and movable core of a magnetic material and a tap connected to the junction of components 7, 8', 9 and 10'. Together with a trace capacitor 24', components 8', 10', 15' form a sawtooth network which is comparable to the sawtooth network comprising the elements 8, 10, 15 and 12 of FIG. 1. Such a circuit is described in United Kingdom Patent Specification 1,511,899 (PHN 7673) and provides the linearity correction when the amplitude of the line deflection current is east-west modulated. In FIG. 4a, the linearity can be corrected in a similar way as the S-correction in FIG. 1, the voltage applied by means of the fourth control stage 23 across capacitor 24' producing, during the trace period, such a correction current through coil 15' and coil 22 that the appropriate linearity correction between the frequencies $f_{min}$ and $f_{max}$ is obtained. As the line deflection current and the correction current produce magnetic fields of the same direction in the core of coil 22, the correction must decrease versus increasing frequency. In the embodiment shown in FIG. 4b, coil 22 has no tap and is included between the junction of coils 14 and 15', on the one hand, and the junction of capacitors 9 and 10', on the other hand. Here the two magnetic fields have opposite directions so that the correction must increase versus an increasing frequency. In FIG. 4b the correction current has a similar variation as the variation represented in FIG. 2 by curve c.

FIG. 5 shows the relevant portion of a circuit with the aid of which the S-correction, the linearity correction and the amplitude correction can be effected independently of each other at different line frequencies. To that end, the circuit comprises 3 control stages, each for converting the line oscillator control voltage into a correction voltage, more specifically the control stages 16 and 23 already mentioned in the foregoing and a third control stage 30. The circuit comprises the same components 5 to 15 as the circuit of FIG. 1, which components are connected in FIG. 5 in the same way as in FIG. 1, and also the same components 8', 10', 15', 24' and 22 as the circuit of FIG. 4b connected in the same way as the corresponding components of FIG. 4b. The circuit of FIG. 5 further includes a fourth sawtooth network having a parallel diode 31, a retrace capacitor 32, a compensation coil 33 and a trace capacitor 34, which are connected in the same way as the corresponding components of the other sawtooth networks already mentioned in the foregoing and satisfy the same, known tuning condition. The four sawtooth networks are arranged in series between the collector of transistor 5 and ground, the four parallel diodes 8', 7, 8 and 31 consequently being arranged in series with the same conduction direction. The correction voltages made available by the respective control stages 23, 16 and 30 are applied to the respective capacitors 24', 10 and 34. For the S and linearity corrections, respectively, the circuit of FIG. 5 operates in a similar way as the respective circuits of FIG. 1 and FIG. 4b. For the amplitude correction, the transfer of stage 30 is chosen such that the voltage across capacitor 34 results in a trace voltage across coil 14, which, as a function of frequency, has the desired variation as illustrated in FIG. 2. If voltage $V_B$ is constant, then the voltage at the collector of transistor 5 is constant during the trace period so that inductance 6 can be in the form of a primary winding of a supply voltage transformer having one or a plurality of secondary windings, for example winding 35, for generating constant direct voltages by means of trace rectification. This also holds for the case in which stage 30 is supplied with a signal $S_V$ of the field frequency, for the east-west modulation of the line deflection current.

The circuit of FIG. 5 can be modified such that the amplitude correction is not effected by means of network 31 to 34 but by means of a supply voltage control as in FIG. 1. Components 30 to 35 can then be omitted, the unconnected terminals of components 8, 10 and 15 being connected to ground and supply voltages being generated elsewhere in the picture display device.

Both the circuit obtained in the way as outlined above and the circuit as shown in FIG. 5 have the disadvantage that one or two control stages, 16 and 23 for FIG. 5, generate correction voltages which are isolated from ground. The circuit shown in FIG. 6 does not have this disadvantage. Compared with FIG. 1, the modification in FIG. 6 implies that that terminal of capacitor 11 not connected to the collector of transistor 5 is connected to a tap of the linearity correction coil 22 one end of which is connected to coil 14, while also coil 15 has a portion beyond a tap. The tap of coil 15 is connected to the junction of capacitor 12 and coil 14. Obviously, coils 22 and 15 may also be constituted by transformers. An inductance 36, through which a sawtooth-shaped current flows which is determined by the control voltage from control stage 16 is included between that end of coil 22 not connected to coil 14 and that end of coil 15 not connected to ground.

Figure 6:
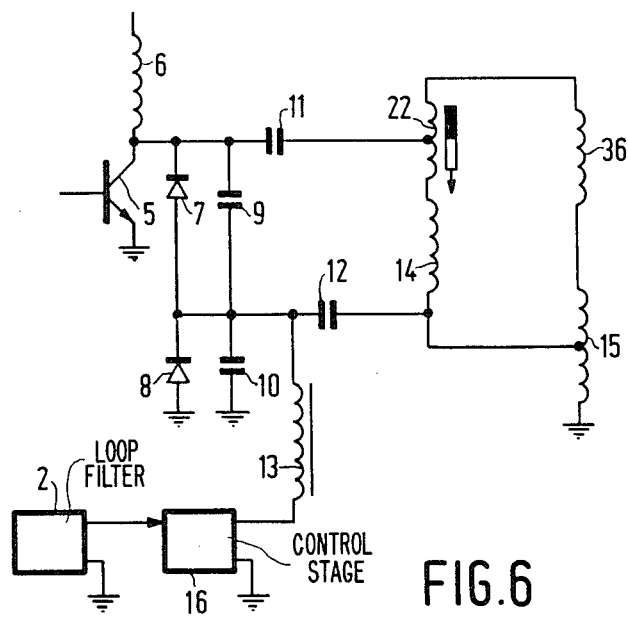

In the combined circuit of FIG. 6, both the linearity and the S-correction can be set using only one control stage, more specifically control stage 16. Because of an appropriate dimensioning of the components of the circuit, it can be accomplished that both the S-correction current flowing through capacitor 12 and the linearity correction current flowing through coil 22 vary in the desired manner versus the frequency. Near $f_{min}$ the control voltage from control stage 16 is high. The lower sawtooth network carries a large current. As a result thereof, the deflection current through capacitor 12 is compensated for for a significant part and the capacitor accomplished only a small S-correction. At the stepped-up end of coil 15, the voltage is approximately equal to the voltage at the collector of transistor 5, so that little correction current is applied to coil 22 via inductance 36. Consequently, the linearity correction is at its maximum. Near the frequency $f_{max}$ the control voltage from control stage 16 is low, so that the S-correction is large, while the linearity correction is small. The amplitude correction is effected in FIG. 6 with the aid of the same means as in FIG. 1.

Figure 7:
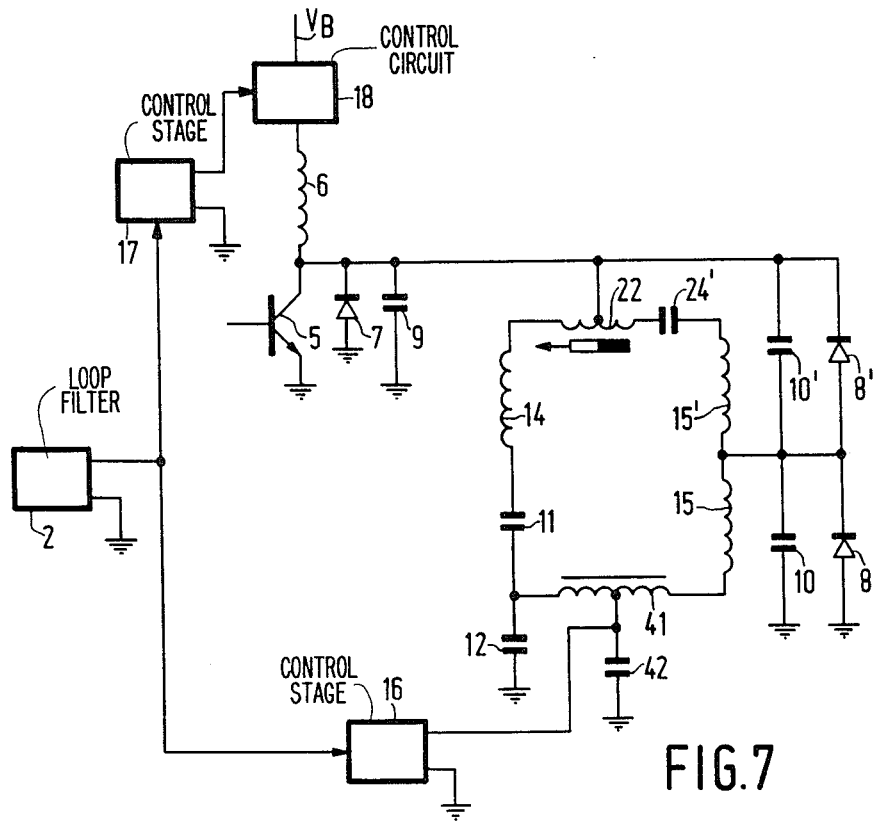

FIG. 7 shows a preferred embodiment of a line deflection circuit according to the invention which is derived from FIG. 5 and in which, as also in FIG. 6, control stage 16 provides both the linearity and the S-correction. In FIG. 5 all the sawtooth networks are arranged in series. In FIG. 7 the deflection network including coil 14 is arranged in parallel with the series arrangement of the linearity correction network comprising coil 15' and the S-correction network comprising coil 15. A portion of coil 22, coil 14, capacitor 11 and capacitor 12 are arranged in series between the tap of coil 22, which is connected to the collector of transistor 5, and ground. The other portions of coil 22, capacitor 24', coil 15', coil 15 and an inductance 41 are arranged in series between said tap and the junction of capacitors 11 and 12, the junction between the coils 15' and 15 being connected to the junction of diodes 8 and 8' and resistors 10 and 10'. Inductance 41 has a tap connected to the output of control stage 16 and to a capacitor 42 whose other terminal is connected to ground. The circuit of FIG. 7 can be dimensioned such that during the trace period, the deflection current flows predominantly through the line deflection coil 14 and the first trance capacitor 11, while a correction current flows predominantly through elements 24', 15', 15 and 41. Both currents flow through components 12 and 22 which thus influence the variation of the deflection current. An appropriate dimensioning of the d.c. voltage applied to capacitor 42 and of the several components of the circuit can accomplish that the linearity error and the S-distortion for all the frequencies between $f_{min}$ and $f_{max}$ can substantially be eliminated. The amplitude error is corrected by means of control circuit 18, with the aid of which also the east-west correction can be effected.

When designing the combined circuit of FIG. 7, in which only one control stage is capable of effecting two corrections, the following consideration may be important, i.e. the fact that the sum of the voltages across capacitors 24' and 42 is substantially equal to the voltage across the series network of capacitors 11 and 12. A similar consideration holds for the circuit of FIG. 6.

In the foregoing, a number of variants have been described of a line deflection circuit suitable for a plurality of line frequencies. Herein the correction signals applied by the control stages, that is to say 16, 17, 21, 23 and 30, are continuous functions of the line frequency. It will be obvious that the circuit may be alternatively be used for the case in which the line frequency can assume only a number of discrete values, in which case each correction signal may be switchable between an equal number of values. It will also be obvious that other variants can be derived from the described circuit variants, the correction signals always being applied in the described manner. The use of the inventive idea need, however, not be limited to the circuit disclosed in the frequently mentioned United Kingdom Patent Specification 1,459,922 and its variants. Other so-called modulators for the east-west correction are known, for example from United Kingdom Patent Specifications 1,574,506 (PHD 76-099) and 1,589,639 and U.S. Pat. Nos. 4,169,988 and 3,879,636. On the basis of the above description, a person skilled in the art will easily understand how the correction signals according to the invention can be applied in such a modulator. It should be noted that the control voltage applied to line oscillator 3 by the loop filter 2, which voltage has a specific value for each value of the line frequency, is not the only useful information about the line frequency for determining the correction signals. Further information also suitable for this purpose is, for example, the time between two consecutive line synchronising pulses, which time can be measured accurately by counting a number of clock pulses. If, in a different manner than in FIG. 1, the locally generated line frequency is obtained by dividing the frequency of the signal from an oscillator oscillating at a higher clock frequency, the frequency divider circuit being controlled for synchronization with the incoming line synchronizing signal, then the value of the divider can be used as an information about the line frequency.

What is claimed is:

1. A picture display device, including a line synchronizing circuit implements as a phase control loop for synchronizing a line oscillator with incoming line synchronizing signals having various frequencies, and a line deflection circuit couupled to the oscillator for generating a line deflection current having a trace and a retrace through a line deflection coil, the coil being coupled to a correction device comprising adjusting means for continuously adjusting a value of the line deflection current, characterized in that an input of a control stage is coupled to the line synchronizing circuit and an output is coupled to the adjusting means for correcting, in dependence on the frequency of the line oscillator, a deflection error of the picture display device upon a change in the line frequency.

2. A picture display device as claimed in claim 1, wherein the adjusting means adjusts a magnitude of an S-correction of the line deflection current, characterized in that the control stage is coupled to the adjusting means for generating, during the trace period, a correction signal for correcting an S-distortion of the picture display device upon a change in the line frequency.

3. A picture display device as claimed in claim 1, wherein the adjusting means adjust a magnitude of a linearity correction of the line deflection current, characterized in that the control stage is coupled to the adjusting means for generating, during the trace period, a correction signal for correcting a linearity error of the picture display device upon a change in the line frequency.

4. A picture display device as claimed in claim 1, wherein the adjusting means adjusts an amplitude of the line deflection current, characterized in that the control stage is coupled to the adjusting means for generating a correction signal for influencing a value of a trace voltage present across the line deflection coil during the trace period, for maintaining the amplitude of the line deflection current substantially constant upon a change in the line frequency.

5. A picture display device as claimed in claim 1, characterized in that an input signal of the control stage is a control signal generated by the phase control loop for the line oscillator, the control stage including a circuit for converting the input signal into an output voltage.

6. A picture display device as claimed in claim 2, characterized in that the control stage is coupled to an S-capacitor for producing, during the trace period, a correction current which flows through said capacitor in a direction opposite to the direction of the line deflection current through this capacitor and decreases versus an increasing line frequency.

7. A picture display device as claimed in claim 3, wherein the correction device comprises a linearity correction arrangement in the form of a saturable inductor arranged in series with the line deflection coil, characterized in that the control stage is coupled to the linearity correction arrangement for producing, during the trace period, a correction current flowing through said linearity correction arrangement in a direction opposite to the direction of the line deflection current though said linearity correction arrangement and increases versus an increasing line frequency.

8. A picture display device as claimed in claim 3, wherein the correction arrangement comprises a linearity correction arrangement in the form of a saturable inductor arranged in series with the line deflection coil, characterized in that the control stage is coupled to the linearity correction arrangement for producing, during the trace period, a correction current which flows through said linearity correction arrangement in the same direction as the line deflection current and decreases versus an increasing line frequency.

9. A picture display device as claimed in claim 4, characterized in that the control stage is coupled to an S-capacitor for applying thereacross a voltage in response to which the trace voltage increases versus an increasing line frequency.

10. A picture display device as claimed in claim 6, 7 or 8, characterized by one single control stage for producing both the correction current for correcting the S-distortion and the correction current for correcting the linearity error.

11. A picture display device as claimed in claim 10, wherein the line deflection circuit comprises a controllable switch and a series arrangement of two diodes arranged in parallel with said controllable switch, characterized in that said line deflection circuit further comprises two series networks which are in parallel with each other, a first of said series networks comprising the linearity correction arrangement, the line deflection coil and a first S-capacitor, and a second of said series networks comprising first, second and third inductors, the parallel network formed by said first and second series networks being connected to a second S-capacitor, and the network thus formed being in parallel with the controllable switch, a junction of the first and second inductor being connected to a junction of the two series diodes, and the control stage being coupled to the third inductor.

12. A picture display device as claimed in claim 1, characterized in that an input signal of the control stage is derived from a time interval between successive line synchronizing pulses, the control stage including a circuit for converting said input signal into an output voltage.

13. A picture display device as claimed in claim 1, wherein said picture display device further includes a frequency divider circuit for dividing a clock frequency for obtaining a locally generated line frequency, the value of the divider being controllable for synchronization, characterized in that an input signal of the control stage is derived from a value of the frequency divider circuit, the control stage including a circuit for converting said input signal into an output voltage.

* * * * *